US012553564B2

(12) United States Patent
Von Dollen

(10) Patent No.: US 12,553,564 B2
(45) Date of Patent: Feb. 17, 2026

(54) METAL-BASED THERMAL INSULATION STRUCTURES

(71) Applicant: SLT Technologies, Inc., Los Angeles, CA (US)

(72) Inventor: Paul M. Von Dollen, Brush Prairie, WA (US)

(73) Assignee: SLT Technologies, Inc., San Diego, CA (US)

( * ) Notice: Subject to any disclaimer, the term of this patent is extended or adjusted under 35 U.S.C. 154(b) by 90 days.

(21) Appl. No.: 18/506,790

(22) Filed: Nov. 10, 2023

(65) Prior Publication Data

US 2024/0159348 A1 May 16, 2024

Related U.S. Application Data

(60) Provisional application No. 63/424,783, filed on Nov. 11, 2022.

(51) Int. Cl.
*B32B 3/10* (2006.01)
*B32B 3/26* (2006.01)
(Continued)

(52) U.S. Cl.
CPC ............ *F16L 59/029* (2013.01); *B32B 3/266* (2013.01); *B32B 15/01* (2013.01); *B32B 15/02* (2013.01);
(Continued)

(58) Field of Classification Search
None
See application file for complete search history.

(56) References Cited

U.S. PATENT DOCUMENTS 3,101,259 A 8/1963 Sawyer
4,230,057 A * 10/1980 Kurz ..................... B32B 3/266
112/420

(Continued)

FOREIGN PATENT DOCUMENTS

AT 395985 B 4/1993
CN 111593398 A 8/2020
(Continued)

OTHER PUBLICATIONS

Selection of Age-Hadenable Superalloys, Nov. 28, 2020 (Year: 2020).*

(Continued)

*Primary Examiner* — Mary I Omori
(74) *Attorney, Agent, or Firm* — Procopio, Cory, Hargreaves & Savitch LLP

(57) ABSTRACT

Embodiments of the disclosure include a thermal insulation structure, comprising a plurality of stacked layers that include a first layer and a second layer. The first layer includes a first surface, a second surface, disposed opposite of the first surface, and a plurality of perforations extending between the first surface and the second surface, wherein the plurality of perforations comprise a first pattern of two or more perforations that form a patterned in a first direction that is parallel to the first surface. The second layer includes a third surface, wherein the third surface is in contact with the second surface of the first layer, a fourth surface, disposed opposite of the third surface, and a plurality of perforations extending between the third surface and the fourth surface, wherein the plurality of perforations comprise a second pattern of two or more perforations that form a pattern in the first direction that is parallel to the third surface.

16 Claims, 8 Drawing Sheets

(51) Int. Cl.
  *B32B 15/01* (2006.01)
  *B32B 15/02* (2006.01)
  *C30B 7/10* (2006.01)
  *F16L 59/02* (2006.01)
(52) U.S. Cl.
  CPC .......... *C30B 7/105* (2013.01); *B32B 2255/06* (2013.01); *B32B 2255/20* (2013.01); *B32B 2307/304* (2013.01); *B32B 2307/7376* (2023.05)

(56) References Cited

U.S. PATENT DOCUMENTS

| | | | |
|---|---|---|---|
| 4,300,979 | A | 11/1981 | Kolb et al. |
| 4,336,292 | A * | 6/1982 | Blair ................. B32B 3/12 428/116 |
| 6,131,644 | A * | 10/2000 | Kohara ................. F28D 17/02 165/4 |
| 7,078,731 | B2 | 7/2006 | D'Evelyn et al. |
| 7,642,122 | B2 | 1/2010 | Tysoe et al. |
| 8,430,958 | B2 | 4/2013 | D'Evelyn |
| 8,979,999 | B2 | 3/2015 | D'Evelyn |
| 9,299,555 | B1 | 3/2016 | Alexander et al. |
| 9,724,666 | B1 | 8/2017 | Rajeev et al. |
| 10,029,955 | B1 | 7/2018 | Rajeev et al. |
| 10,036,099 | B2 | 7/2018 | D'Evelyn et al. |
| 10,174,438 | B2 | 1/2019 | Pakalapati et al. |
| 2005/0152820 | A1 | 7/2005 | D'Evelyn et al. |
| 2008/0083741 | A1 | 4/2008 | Giddings et al. |
| 2009/0301387 | A1 | 12/2009 | D'Evelyn |
| 2009/0320744 | A1 | 12/2009 | D'Evelyn et al. |
| 2009/0320745 | A1 | 12/2009 | D'Evelyn et al. |
| 2010/0031876 | A1 | 2/2010 | D'Evelyn |
| 2011/0183498 | A1 | 7/2011 | D'Evelyn |
| 2014/0205840 | A1 | 7/2014 | Aoki et al. |
| 2015/0345868 | A1 | 12/2015 | Grohs et al. |
| 2016/0082502 | A1 * | 3/2016 | Appleby ................. B22C 9/10 164/369 |
| 2016/0194781 | A1 | 7/2016 | Pimputkar et al. |
| 2016/0376726 | A1 | 12/2016 | Hashimoto |
| 2017/0152607 | A1 * | 6/2017 | Wang ................. C25D 17/008 |
| 2019/0184677 | A1 * | 6/2019 | Zagorski ................. B32B 7/12 |
| 2019/0234068 | A1 * | 8/2019 | Mack ................. B32B 3/04 |
| 2022/0136128 | A1 | 5/2022 | D'Evelyn et al. |
| 2023/0110306 | A1 | 4/2023 | D'Evelyn et al. |
| 2024/0026562 | A1 | 1/2024 | D'Evelyn et al. |
| 2024/0158948 | A1 | 5/2024 | Von Dollen et al. |
| 2024/0158949 | A1 | 5/2024 | Von Dollen |
| 2024/0158950 | A1 | 5/2024 | Von Dollen et al. |
| 2024/0158951 | A1 | 5/2024 | Von Dollen et al. |

FOREIGN PATENT DOCUMENTS

| | | |
|---|---|---|
| CN | 216768741 U | 6/2022 |
| EP | 2505696 A1 | 10/2012 |
| JP | 2013067556 A | 4/2013 |
| JP | 2013095643 A | 5/2013 |
| JP | 2021152434 A * | 9/2021 |
| WO | 0046493 A1 | 8/2000 |
| WO | 2017205882 | 7/2017 |

OTHER PUBLICATIONS

Matsumoto et al., machine translation of JP 201152434, Sep. 30, 2021 (Year: 2021).*
Secondary Finishes, Oct. 28, 2021, https://www.bankerwire.com/resources/secondary-finishes/ (Year: 2021).*
John, Thermal Conductivity of Stainless Steel Explained & Chart, Sep. 24, 2024 (Year: 2024).*
Surface Finishing, 2025, sk-skrlj (Year: 2025).*
Daisuke Tomida et al., Effect of halogen species of acidic mineralizer on solubility of GaN in supercritical ammonia, Journal of Crystal Growth 325 (2011), pp. 52-54.
D. Peters et al., Ammonothermal Synthesis of Aluminium Nitride, Journal of Crystal Growth 104 (1990), pp. 411-418.
R. Dwinlinski et al., Excellent crystallinity of truly bulk ammonothermal GaN, Journal of Crystal Growth 310 (2008) 3911-3916.
Ehrentraut et al., Ammonothermal Crystal Growth of Gallium Nitride—A brief discussion of critical issues, Journal of Crystal Growth, Elsevier, Amsterdam, Sep. 1, 2010, 5 pages.
PCT/US2022/077867, International Search Report and Written Opinion dated Jan. 20, 2023, 11 pages.
PCT/US2023/070631, International Search Report and Written Opinion dated Nov. 7, 2023, 10 pages.
PCT/US2023/079423, International Search Report and Written Opinion dated Feb. 27, 2024, 11 pages.
PCT/US2023/078816, International Search Report and Written Opinion dated Feb. 9, 2024, 15 pages.
PCT/US2023/079391, International Search Report and Written Opinion dated Feb. 8, 2024, 10 pages.
PCT/US2023/079417, International Search Report and Written Opinion dated Feb. 27, 2024, 15 pages.
Anonymous: "Stainless Steel Perforated Metal", Anping Shengjia Hardware & Mesh Co., Ltd., Apr. 16, 2021 (Apr. 16, 2021), pp. 1-4, XP093128625 <https://web.archive.org/web/20210416114542/https://www.sjhardwaremesh.com/en/products/stainless-steel/stainless-steel-perforated-metal.html>, 5 pages.

* cited by examiner

METAL-BASED THERMAL INSULATION STRUCTURES

CROSS-REFERENCE TO RELATED APPLICATIONS

This Application claims the benefit of U.S. Provisional Application 63/424,783 filed on Nov. 11, 2022 which is herein incorporated by reference in its entirety.

BACKGROUND

Field

Embodiments of the present disclosure generally relate to an apparatus and method of processing of materials in supercritical fluids for growth of crystals. More specifically, embodiments of the present disclosure relate to thermal insulation structures used during the processing of materials for growth of crystals.

Description of the Related Art

The processing of materials in supercritical fluids for growth of crystals is useful for forming crystalline substrates that can be used to form a variety of optoelectronic, integrated circuit, power device, laser, light emitting diode, photovoltaic, and other related devices. Examples of such crystals include metal oxides, such as aluminum phosphate ($AlPO_4$), gallium phosphate ($GaPO_4$), aluminum arsenate ($AlAsO_4$), gallium arsenate ($GaAsO_4$), and metal nitrates such as gallium nitride (GaN), aluminum nitride (AlN), indium nitride (InN), indium gallium nitride (InGaN), aluminum gallium nitride (AlGaN), and aluminum indium gallium nitride (AlInGaN).

Supercritical fluids are often used to grow crystals of a wide variety of materials from seed crystals. A supercritical fluid is often defined as a substance beyond its critical point, i.e., critical temperature and critical pressure. A critical point represents the highest temperature and pressure at which the substance can exist as a vapor and liquid in equilibrium. In certain supercritical fluid applications, the materials being processed are placed inside a pressure vessel or other high-pressure apparatus. In some cases, it is desirable to first place the materials inside a container, liner, or capsule, which in turn is placed inside the high-pressure apparatus. In operation, the high-pressure apparatus provides structural support for the high pressures generated within the container or capsule holding the materials. The container, liner, or capsule provides a closed/sealed environment that is chemically inert and impermeable to solvents, solutes, and gases that may be involved in or generated by the process.

In operation, the high-pressure apparatus provides structural support for the high pressures generated within the container or capsule holding the materials. However, the components used to support the high pressures generated within the container or capsule holding the materials often act as a heat sink that creates significant heat loss and thus large temperature variations between different regions of the high-pressure apparatus which affect the crystal growth process within these different regions of the high-pressure apparatus. Heat loss through the axial supporting load bearing elements found at opposing ends of the high-pressure apparatus is a common area of a high-pressure apparatus that sees a larger than desired variation in temperature as compared with the central region of the high-pressure apparatus.

Thermal insulation structures used to reduce the amount of heat loss and support the load generated in the container, liner, or capsule of the high-pressure apparatus during processing are typically made of costly thermally insulating ceramic materials. The ceramic insulation structures are brittle and are subject to fracture due to thermal cycling and/or high stress generating mechanical loads that cause premature failure and/or significantly reduce their useful lifespan.

Therefore there is a need for a method and apparatus that solves the problems describe above. Accordingly, improved thermal insulation structures are needed in the art.

SUMMARY

Embodiments of the present disclosure generally relate to the processing of materials in supercritical fluids for growth of crystals. More specifically, embodiments of the present disclosure relate to thermal insulation structures used in the processing of materials for growth of crystals.

Embodiments of the disclosure include a thermal insulation structure, comprising a plurality of stacked layers. The plurality of stacked layers comprise: a first layer and a second layer. The first layer comprising: a first surface; a second surface, disposed opposite of the first surface; and a plurality of perforations extending between the first surface and the second surface, wherein the plurality of perforations comprise a first pattern of two or more perforations that form a patterned in a first direction that is parallel to the first surface. The second layer comprising: a third surface, wherein the third surface is in contact with the second surface of the first layer; a fourth surface, disposed opposite of the third surface; and a plurality of perforations extending between the third surface and the fourth surface, wherein the plurality of perforations comprise a second pattern of two or more perforations that form a pattern in the first direction that is parallel to the third surface.

Embodiments of the disclosure also include a thermal insulation structure, comprising: a spiral layer, wherein the spiral layer comprises a first layer formed in a spiral pattern that extends form a central axis. The spiral layer further comprising: a first surface that is perpendicular to the central axis, a second surface, disposed opposite of the first surface, and a plurality of perforations, wherein the plurality of perforations extend through the first layer in a first direction that is at an angle to the central axis.

Embodiments of the disclosure also include a thermal insulation structure, comprising a first tubular shaped layer and a second tubular shaped layer. The first tubular shaped layer comprising a first wall having a first thickness, a first inner diameter and a first length that is aligned with a central axis of a first tubular shaped layer, wherein the first wall includes an inner surface and an outer surface, wherein the inner surface defines the inner diameter, and a plurality of perforations, wherein the plurality of perforations extend through the first wall from the inner surface to the outer surface. The second tubular shaped layer comprising a second wall having a second thickness, a second inner diameter and a second length that is aligned with the central axis, wherein the second wall includes an inner surface and an outer surface, wherein the inner surface defines the second inner diameter, and a plurality of perforations, wherein the plurality of perforations extend through the second wall from the inner surface to the outer surface. The first tubular shaped layer and the second tubular shaped layer form a concentric pattern.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure include an apparatus and methods of performing high pressure and high temperature material processing techniques, which are often used to grow crystalline materials. Some embodiments of the present disclosure provide an improved processing vessel design that improves the thermal and structural characteristics of a high-pressure processing vessel.

In general, the materials being processed are placed inside a pressure vessel or other high-pressure apparatus for processing. In some cases, it is desirable to first place the materials inside a container or capsule, which in turn is placed inside load-bearing supporting elements that form part of the high-pressure apparatus. In operation, the high-pressure apparatus provides structural support for the high pressures generated within the container or capsule that includes the crystal growth processing materials. The container, liner, or capsule provides a closed/sealed (e.g., hermetic) environment that is chemically inert and impermeable to solvents, solutes, and gases that may be involved in or generated within the crystal growth process. In one example, the designs disclosed herein can include the use of material processing techniques that include the use of a supercritical fluid to perform a crystal growth of a group III metal nitride crystal by an ammonobasic or ammonoacidic technique, but there can be others. Such crystals and materials include, but are not limited to, GaN, AlN, InN, InGaN, AlGaN, and AlInGaN, and others for manufacture of bulk or patterned substrates. Such bulk or patterned substrates can be used for a variety of applications including optoelectronic devices, lasers, light emitting diodes, solar cells, photoelectrochemical water splitting and hydrogen generation, photodetectors, integrated circuits, and transistors, among other devices.

As noted above, the components used to support the high pressures generated within the container or capsule often act as a heat sink that creates a significant heat loss and thus large temperature variations between different regions of the high-pressure apparatus. Heat loss through the axial supporting load bearing elements found at opposing ends of the high-pressure apparatus is a common area of a high-pressure apparatus that sees a larger than desired variation in temperature as compared with the central region of the high-pressure apparatus. Conventional thermal insulation structures are typically made of costly ceramic materials and suffer from a number additional issue, which include a short lifespan. Accordingly, there is a need for an improved thermal insulation structure.

Example Pressure Vessel

Figure 1:
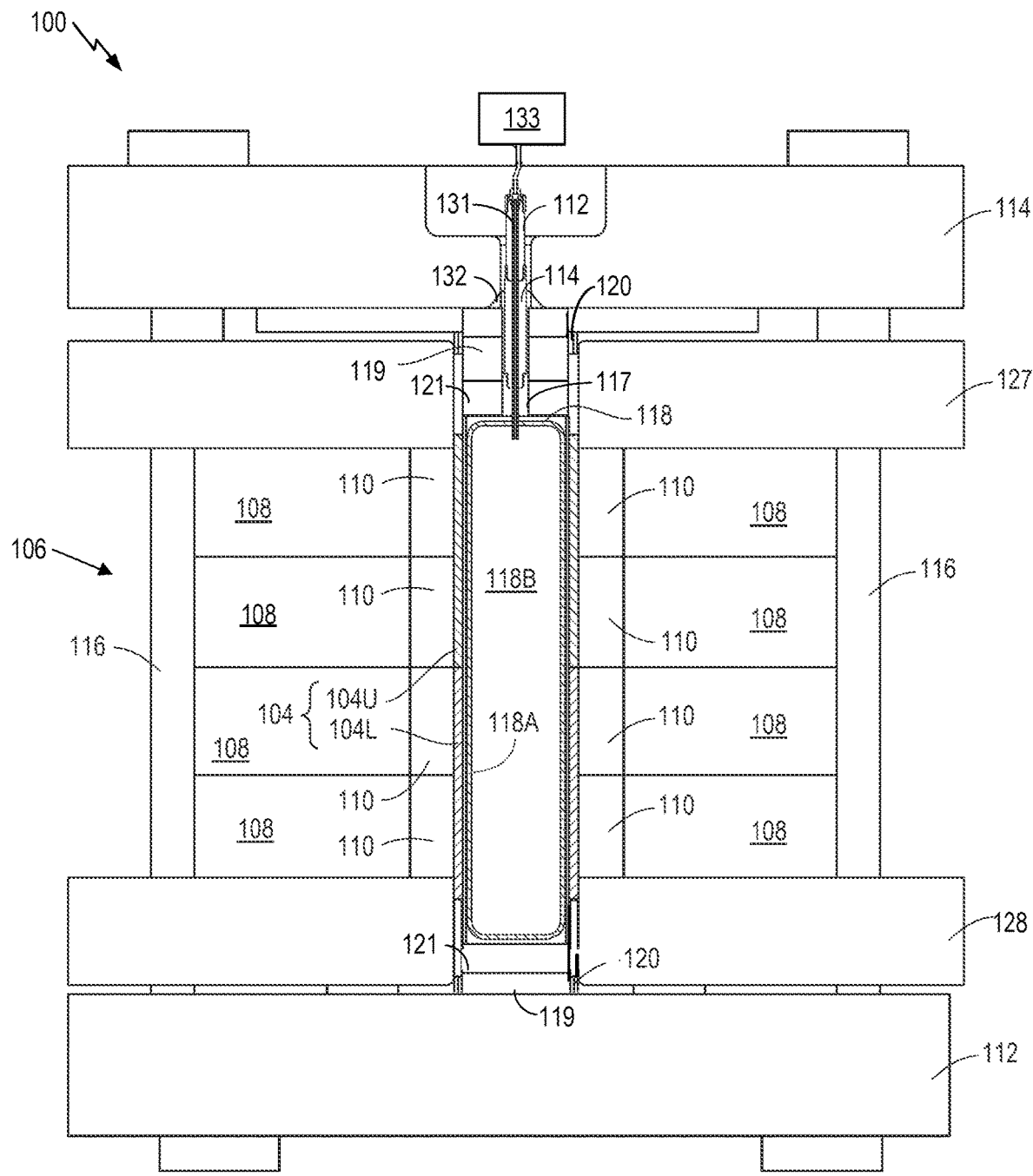
FIG. 1 depicts a schematic cross-sectional view of a pressure vessel assembly according to one or more embodiments of the present disclosure.

FIG. 1 depicts a schematic cross-sectional view of a pressure vessel 100 according to an embodiment of the present disclosure. The pressure vessel 100 is adapted to provide adequate structural confinement in all directions for a process capsule 118 disposed within the load bearing supporting elements of the pressure vessel 100 during high-temperature and high-pressure operations. For example, the material processing techniques performed the process capsule 118 can achieve pressures about 5 MPa to about 2000 MPa, and temperatures between about 200° C. and 1500° C. In one example, the crystal growth process includes an ammonothermal crystal growth process that is performed at temperatures between 400° C. and 1,500° C., such as between 600° C. and 900° C., and the process chemistries can include, but are not limited to, an ammonobasic or ammonoacidic chemistry. In some examples, the crystal growth process includes the use of a chemistry that includes one or more of F, Cl, Br, I, HF, HCl, HBr, HI, Ga, Al, In, GaN, AlN, InN, and $NH_3$. Additionally, materials resistant to the corrosive process environment at high temperatures typically have poor mechanical properties and are not suitable to be used for high pressure containment.

As shown in FIG. 1, the pressure vessel 100 includes a process capsule 118. An internal volume 118B of the process capsule 118 is the processing environment of the pressure vessel 100 in which a high-temperature crystal growth process is performed. A fill-tube lower boss 117 is positioned over a top portion of the process capsule 118 and is used to support a fill tube 131. The pressure vessel 100 includes a fill tube assembly and pressure vessel 100. The fill tube assembly includes the fill tube 131 that is axially surrounded by a sleeve 132 extending along the length of the fill tube 131. One end of the fill tube 131 is in fluid communication with the process capsule 118 and is used to introduce or fill chemicals into a process environment of the process capsule 118 during a pre-processing stage of a crystal growth process and fluidly communicate with the processing environment during the crystal growth process. The other end of the fill tube 131 is connected to a manifold (not shown), and the interior volume of the fill tube 131 is in fluid communication with the interior volume of the manifold and a fluid source 133, which is coupled to the manifold.

The pressure vessel 100 further includes a bottom crown assembly 112, a top crown assembly 114, and tie rods 116. The bottom crown assembly 112 and the top crown assembly 114 are configured to support the axial load generated by the pressure formed in the process capsule 118 during the crystal growth process. The bottom crown assembly 112, the top crown assembly 114, and the tie rod 116 may each be formed of mechanically robust material, such as steel, low-carbon steel, SA723 steel, SA266 carbon steel, 4340 steel, A-286 steel, iron based superalloy, 304 stainless steel, 310 stainless steel, 316 stainless steel, 340 stainless steel, 410 stainless steel, 17-4 precipitation hardened stainless steel, zirconium and its alloys, titanium and its alloys, and other materials commonly known as Monel®, Inconel®, Hastelloy®, Udimet® 500, Stellite, Rene® 41, and Rene® 88.

The process capsule 118 may be formed of platinum, palladium, iridium, a platinum iridium alloy, gold, or silver, titanium, rhenium, copper, iron, nickel, stainless steel, zirconium, tantalum, molybdenum, niobium, alloys thereof, and the like. The fill-tube lower boss 117, and the end plug assemblies 119 may each be formed of mechanically robust material, such as steel, low-carbon steel, SA723 steel, SA266 carbon steel, 4340 steel, A-286 steel, iron based superalloy, nickel based superalloy, cobalt based superalloy, Inconel® 718, Rene® 41, 304 stainless steel, 310 stainless steel, 316 stainless steel, 340 stainless steel, 410 stainless steel, and 17-4 precipitation hardened stainless steel, zirconium and its alloys, titanium and its alloys, and other materials commonly known as Monel®, Inconel®, Hastelloy®, Udimet® 500, Stellite®, Rene® 41, and Rene® 88.

The process capsule 118 is surrounded by a radially positioned heater 104 that is surrounded by a stack of ring assemblies 106. The radially positioned heater 104 may include an upper heater 104U and a lower heater 104L that are each independently controllable to provide a desired amount of heat to the upper and lower portions of the internal volume 118B. During a high-temperature crystal growth process, the internal volume 118B of the process capsule 118 is heated by use of the radially positioned heater 104 and end heaters 121 to a temperature of about 200° C. and 1500° C., and is filled with a process fluid, such as ammonia or hydrofluoric acid (HF), in which a mineralizer is dissolved, under a high pressure of about 5 MP and about 2000 MP. At these temperatures and pressures it is often desirable to cause the process gases to achieve a supercritical fluid state to enhance the crystal growth process. The internal volume 118B of the process capsule 118 is defined by an interior surface 118A of the process capsule 118.

The ring assemblies 106 each include an enclosure ring 108 and a ceramic ring 110 that is surrounded by the enclosure ring 108. The ring assemblies 106 may provide radial confinement for pressure generated within the process capsule 118 and transmitted outward through the heater 104. The ring assemblies 106 are supported on a top end and a bottom end by ring supports 127, 128, respectively, which are used to take some of an axial load created during processing.

The heater 104 and end heaters 121 can include resistive heating elements that have a desired total power and power density to achieve a desired temperature and temperature distribution in the interior region 108B.

As noted above, it is common for the components used to support the high pressures generated by the radially positioned heater 104 and end heaters 121 to act as a heat sink which could cause a significant heat loss and thus large temperature variation in the process capsule 118 of the pressure vessel 100. As is discussed further below, in an effort to reduce the heat loss to the bottom crown assembly 112 and a top crown assembly 114, end plug assemblies 119 are provided, which along with their load bearing capabilities also act as a thermal insulating barrier. The end plug assemblies 119 are also mechanically supported and radially confined by end plug jackets 120. The end plug jackets 120 may be formed of steel, stainless steel, an iron-based alloy, or a nickel-based alloy. The end plug jackets 120 may also provide mechanical support and/or axial confinement for the radially positioned heater 104.

Metal-Based Thermal Insulation Structure

Figure 2A:
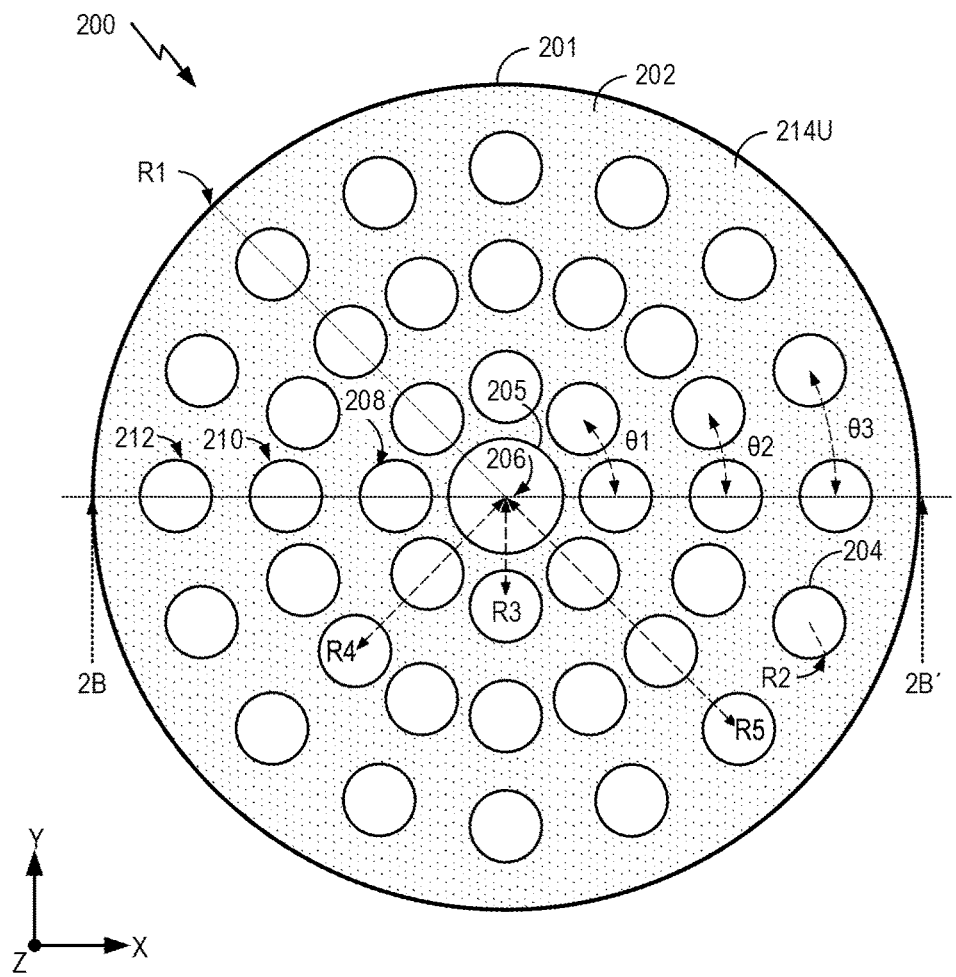
FIG. 2A depicts a schematic plan view of a thermal insulation structure according to one or more embodiments of the present disclosure.
Figure 2B:
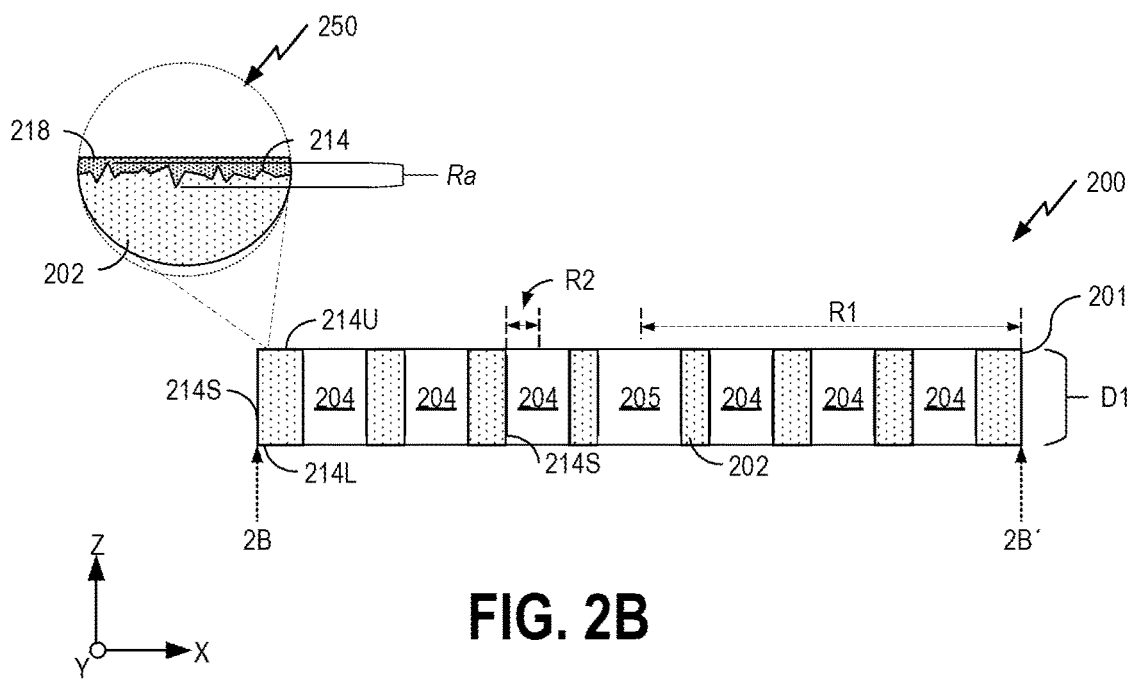
FIG. 2B depicts a schematic cross-sectional view of a portion of the thermal insulation structure illustrated in FIG. 2A, according to one or more embodiments of the present disclosure.

In some embodiments, the end plug assemblies 119, illustrated in FIG. 1, each include a thermal insulation structure 200. FIG. 2A illustrates a top-view schematic diagram showing a thermal insulation structure 200 according to an embodiment of the current disclosure. As is discussed further below, the thermal insulation structure 200 includes a plurality of stacked layers 201 that are configured to provide desired thermal insulating properties, load bearing properties and have a desired physical size to be used as a structural element in the pressure vessel 100. FIG. 2B is a side cross-sectional view of a layer 201 formed by use of the section line 2B-2B' shown in FIG. 2A.

The plurality of stacked layers 201 of the thermal insulation structure 200 include an insulation material 202. The insulation material 202 may be any metal-based material with a sufficiently low thermal conductivity (e.g., a thermal conductivity below about 20-25 watts per meter-kelvin (W/m-° K)). In one example, the insulation material 202 includes, but is not limited to, 304 stainless steel, zirconium and its alloys, Ti-6Al-4V, titanium-based alloys, superalloys (e.g., iron based superalloy, nickel based superalloy, or cobalt based superalloy), or combinations thereof. Examples of superalloys will include Hastelloy®, Udimet®, Stellite®, Inconel®, or Rene© alloys. In one example, the layers 201 include an Inconel material, such as Inconel 625 or Inconel 718, which each have a thermal conductivity in a range between about 9 and about 21 W/m-K at temperatures between about 23° C. and 600° C., and also a high strength at high temperatures (e.g., >400° C.).

In some embodiments, the thermal insulation structure 200 has a circular exterior profile with a first radius R1, as measured from a central axis 206 that extends in a first direction (e.g., z-direction). In some embodiments, the thermal insulation structure 200 may have a non-circular exterior profile. In other embodiments, each of the layers 201 in the thermal insulation structure 200 may have a different exterior profile from another layer 201 within the thermal insulation structure 200. While not intending to limit the scope of the disclosure provided herein, the first radius R1 can be between about 25 millimeters (mm) and about 500 mm. For example, the first radius R1 is between about 50 mm and about 150 mm. For example, the first radius R1 is between about 50 mm and about 300 mm. For example, the first radius R1 is between about 50 mm and about 400 mm.

For example, the first radius R1 is between about 50 mm and about 500 mm. In some embodiments, the first radius R1 is between about 500 mm and about 1800 mm. For example, the first radius R1 is between 500 mm and 1000 mm. For example, the first radius R1 is between 1000 mm and 1500 mm. For example, the first radius R1 is between 1500 mm and 1800 mm. For example, the first radius R1 is between 1600 mm and 1800 mm.

The exterior profile of the plurality of stacked layers 201 may be formed, in one example, by any suitable process including, but not limited to, casting, machining, trimming, additive manufacturing processes (e.g. 3D printing), or combination thereof. In other examples, the exterior profile of the plurality of stacked layers 201 may be formed, by any suitable process including, but not limited to, forging, stamping, trimming, pressing, sintering, punching, laser cutting, plasma cutting, oxyfuel cutting, grinding, electrical discharge machining, subtractive manufacturing processes, or combinations thereof.

The thermal insulation structure 200 includes at least one perforation 204 formed within each layer 201. FIG. 2A includes a plurality of perforations 204. In some embodiments, the perforations 204 are formed in insulation structure pattern, or an array, such as a circular array illustrated in FIG. 2A. In one example, each perforation 204 is characterized by a circular profile or shape that has a second radius R2. The second radius R2 is about 0.25 millimeters (mm) to about 15 mm. For example, the second radius R2 is about 1 mm to about 10 mm. In some embodiments, each perforation 204 within an array may have a non-circular profile. In other embodiments, each perforation 204 may have a different size and/or shaped profile. In some embodiments, one or more of the perforations 204, may be sized so to operate as a pass-through 205 (e.g., via or channel) in order to permit the passage of wiring (e.g., heater lead wires), plumbing (e.g., fill tube 131), instrumentation (e.g., thermocouples), or other items, through the thermal insulation structure 200.

In some embodiments, the perforations 204 are placed in a circular array having one or more concentric circular rows spaced radially from the central axis 206. In other embodiments, the perforations 204 may be formed in a two-dimensional linear pattern (e.g., a grid pattern or a mesh pattern), a hexagonal close-packed type pattern, a two-dimensional non-linear pattern, a repeating pattern, a radial pattern, a random pattern, or combination thereof.

In one example, the circular array begins with a central perforation (e.g., pass-through 205) with three additional rows, a first row 208, and a second row 210, and a third row 212. In some embodiments, there may be one row, to as many rows as required. For example, there may be one row to about 10 rows. For example, there may be one row to about five rows. For example, there may be one row to about 20 rows. For example, there may be one row to about 50 rows. For example, there may be one row to about 75 rows. For example, there may be one row to about 100 rows. For example, there may be more than about 100 rows.

In one example, as shown in FIG. 2A, the first row 208 forms a circular pattern of 8 perforations 204 separated by an angle θ1 at a radius R3 from the central axis 206. The second row 210 forms a circular pattern of 16 perforations 204 separated by an angle θ2 at a radius R4 from the central axis 206. The third row 212 forms a circular pattern of 8 perforations 204 separated by an angle θ3 at a radius R5 from the central axis 206.

In one embodiment, each radius, radius R3, radius R4, and radius R5 of the circular pattern is evenly radially spaced from the central axis 206. In other embodiments, the spacing between each row may be different. In yet other embodiments, each perforation 204 of the at least one perforation 204 may each have a different radius, or a different spacing, from another perforation 204.

In one embodiment, each perforation 204 of the one or more perforations 204 is normal to the upper surface 214U, normal to the lower surface 214L, or normal to both surfaces 214. In other embodiments, each perforation 204 of the one or more perforations 204, may be angled relative to the upper surface 214U, the lower surface 214L, or both surfaces 214.

In one embodiment, the number, size, angle, and pattern of perforations 204 though a layer 201 is determined by a percentage of open area (i.e., the area occupied by the perforations 204) for each respective layer 201. For example, the open area percentage for each respective layer 201 is measured by a sum of the open areas of the plurality of perforations 204 measured at a plane that is aligned parallel to a surface of the layer 201. In one example, the open area percentage is about 10% to about 60%, such as between about 20% and about 50%, or between about 30% and about 50%. In another example, the open area percentage is about 50%, or less.

The perforations 204 may be formed, in one example, by any suitable process including, but not limited to, stamping, punching, laser cutting, electrical discharge machining, additive manufacturing processes (e.g., 3D printing), bubbling gases or introducing fugitive materials in a casting process to leave perforations or voids, or combination thereof. In another example, the perforations 204 may be formed, by any suitable process including, but not limited to, plasma cutting, oxyfuel cutting, grinding, chemical etching, subtractive manufacturing processes, or combination thereof. In some embodiments, the one or more perforations 204 may be formed after construction of a thermal insulation assembly described below. In one embodiment, the perforations 204 may be formed by the arrangement of the insulation material 202 of the thermal insulation structure 200. For example, in one embodiment, the thermal insulation structure 200 may be formed in a grid pattern where the surfaces of the insulation material 202 of the grid defines the shape of the perforations 204.

In another embodiment, the thermal insulation structure 200 can include one or more layers of an insulating material 200 containing mesh (e.g., metal wire mesh). The mesh may include a woven, intertwined or welded metal wire mesh that includes a material used to form the insulation material 202 described herein. In some embodiments, the thermal insulation structure 200 can include one or more mesh layers that are interposed between one or more layers 201 formed from a solid metal sheet or plate. In some embodiments, the surface of one or more mesh layers disposed within the thermal insulation structure 200 may include a surface that includes a desired roughness, a surface that includes a coating as described herein, or both.

By including at least one perforation 204 in each thermal insulation structure, thermal conductivity may be reduced by replacing solid material (e.g., a portion of the insulation material 202 of layer 201) with a substance (e.g., air) having a lower thermal conductivity than the solid material. In some embodiments, the substance having a lower conductivity than the solid material of the layer 201 is a solid material that is unable to withstand the loads generated during processing, but has desirable thermal insulating properties. In this case, while the lower conductivity material is unable to support the generated loads, the remaining material used to form the layer 201 is configured to support the generated loads.

Each layer 201 of a thermal insulation structure 200 includes an upper surface 214U and a lower surface 214L. The surfaces 214 being perpendicular to the central axis 206, and the load bearing direction. The thermal insulation structure 200 has an insulation material thickness D1 extending between the upper surface 214U and the lower surface 214L. The insulation material thickness D1 is about 0.025 mm millimeters (mm) to about 10 mm. For example, the insulation material thickness D1 is about 0.025 mm to about 5 mm. For example, the insulation material thickness D1 is about 0.025 mm to about 3 mm. For example, the insulation material thickness D1 is about 0.5 mm. As will be discussed further below, the thickness of the layers 201 within the thermal insulation structure 200 may be varied to achieve a desired thermal conduction resistance within one or more regions of the thermal insulation structure 200.

The thermal insulation structure 200 includes an upper surface 214U, a lower surface 214L, and both internal, and external, side surfaces 214S (collectively referred to as surfaces 214), which can each include a surface characteristic, which is shown in the close-up view 250 provided from FIG. 2B. An example of a surface characteristic is illustrated by a magnification of the surfaces 214.

A thermal insulation structure 200 that includes a thermal insulation assembly 300 (FIG. 3A) that includes the plurality of layers 201, which magnifies the effect of thermal contact resistance, that exists whenever heat moves between two discrete bodies (e.g., the plurality of layers 201) that are in solid-to-solid contact. The effects of thermal contact resistance may be adjusted by altering the roughness (i.e., the roughness average (Ra)), cleanliness, contact pressure, or combination thereof, of the adjacent surfaces 214 of adjacent layers 201.

In one embodiment, the surfaces 214 can have a desired roughness average (Ra) or surface features formed thereon. The surfaces 214 of plurality of stacked layers 201 of the thermal insulation structure 200 can be prepared by any suitable process to achieve a target Ra. The target Ra is about 0.5 micrometers (µm) to about 5 µm. In one example, processes to achieve the target Ra include, but are not limited to, sanding, grinding, media blasting, or any combination thereof. In another example, processes to achieve the target Ra may include, but are not limited to, pressing, forging, embossing, knurling, chemical etching, grinding, sand blasting, grit blasting, or any combination thereof.

The close-up view 250 of FIG. 2B additionally illustrates a coating 218 that may be optionally formed over the surfaces 214 of the layers 201. The coating 218 may be applied to one or more of the surfaces 214 of one or more of the layers 201 of the thermal insulation structure 200. The coating 218 can be solid layer, or porous layer, including a ceramic material, a glass material, a material with a lower thermal conductivity than the insulation material 202, an oxide, or any combination thereof. In one example, the coating 218 is applied by a variety of coating methods including, but not limited to, dip coating, painting, extruding, screen printing, inkjet printing, sublimation printing, sputtering, plasma spraying, arc spraying, electroplating, powder coating, or any similar process, or combination of processes.

Thermal Insulation Assembly

Figure 3A:
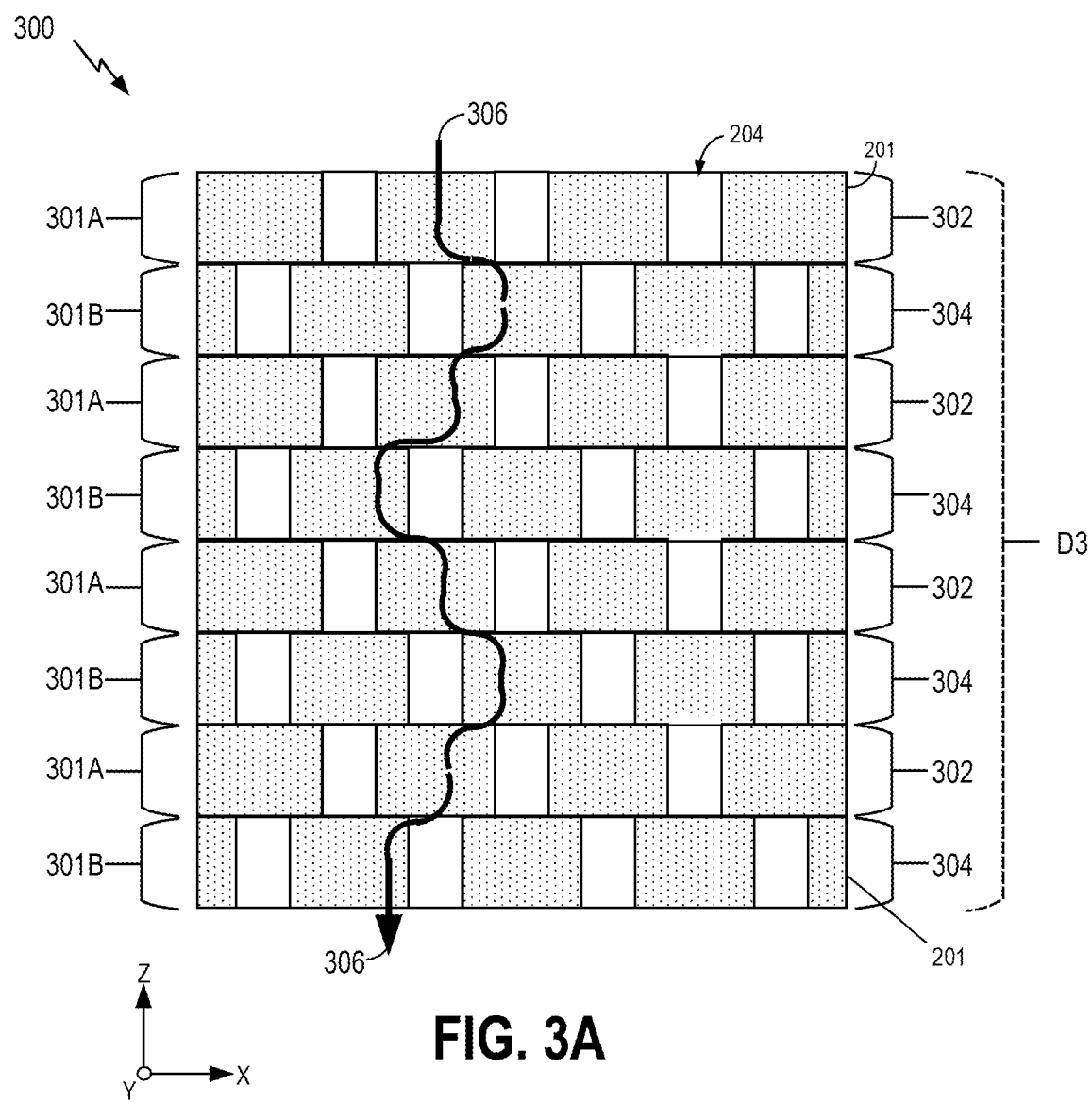
FIG. 3A depicts a schematic cross-sectional view of a thermal insulation assembly according to one or more embodiments of the present disclosure.

FIG. 3A depicts a schematic cross-sectional view of a thermal insulation structure 200 that comprises a thermal insulation assembly 300. The thermal insulation assembly 300 includes one or more layers 201. In one embodiment, the one or more layers 201 of the thermal insulation assembly 300 may include about one to about 100 layers. In another embodiment, the one or more layers 201 of the thermal insulation assembly 300 may include about 100 to about 500 layers. In another embodiment, the one or more layers 201 of the thermal insulation assembly 300 may include about 500 to about 1000 layers.

The one or more layers 201 of the thermal insulation assembly 300 are vertically stacked to form a right cylinder to a thermal insulation assembly height D3. The thermal insulation assembly height D3 is about 12 millimeters (mm) to about 250 mm, such as about 200 mm in height. In one embodiment, thermal insulation assembly height D3 may be about 12 mm to about 300 mm. In another embodiment, the thermal insulation assembly height D3 may be about 12 mm to about 350 mm. In another embodiment, the thermal insulation assembly height D3 may be about 12 mm to about 400 mm. In another embodiment, the thermal insulation assembly height D3 may be about 12 mm to about 450 mm. In another embodiment, the thermal insulation assembly height D3 may be about 12 mm to about 500 mm. However, in some large pressure vessel 100 configurations the thermal insulation assembly 300 can have a thermal insulation assembly height D3 that is between 1 meter (m) and 20 m, such as between 15 m and 20 m.

In some embodiments, the layers 201 have a thickness between about 0.025 mm and about 10 mm, such as between about 0.025 mm and 5 mm, or between about 0.5 mm and 3 mm. In some embodiments, the layers 201 have a thickness that is less than about 10 mm, such as less than about 5 mm, or less than about 1 mm, or less than about 0.5 mm.

The one or more layers 201 used to form the thermal insulation assembly 300 may have one or more insulation structural patterns, such as an array of perforations, desired surface finish, or optional coating to name just a few. Each of the one or more insulation structure patterns can be a combination of the structural features described above in FIG. 2.

In one embodiment, a first layer 301A having a first insulation structure pattern and a second layer 301B having a second insulation structure pattern are disposed in a vertically alternating pattern (e.g., 302, 304, 302, 304, 302, 304, 302, 304) in order to reduce the amount layer-to-layer contact area of the thermal insulation assembly 300. In some embodiments, additional layers 201 having additional insulation structure patterns may be vertically arranged in any combination, pattern, or combination of patterns to form a thermal insulation assembly 300, which is configured to reduce the layer-to-layer contact area. In other embodiments, additional layers having additional insulation structure patterns may be vertically arranged randomly to form the thermal insulation assembly 300, which is used to reduce layer-to-layer contact area. By using thinner layers, adding coatings, and reducing the layer-to-layer contact area, the net thermal conductivity of the thermal insulation assembly 300 can be reduced, and the effects of thermal contact resistance can be enhanced.

In some embodiments, the thermal insulation assembly 300 may include only a single layer 201. In this embodiment, the single layer 201 of the may be formed by an additive manufacturing process which allows voids to be created within the insulation material 202. For example, by creating perforations, or voids, in the single thermal insulation structure 200 using an additive manufacturing process.

Each layer 201, of the one or more layers 201 forming the thermal insulation assembly 300 may be affixed to one another to prevent the layers from sliding or slipping under mechanical load.

In one embodiment, the thermal insulation assembly 300 will include end plates that are placed on either end, or both ends, of the thermal insulation assembly 300. Tie rods spanning the thermal insulation assembly 300 and passing through the end plates may then be used to hold the thermal insulation assembly together. The tie rods may be tubular, or solid and may be affixed to the end plates via mechanical means, such as bolting or threading, or joined using techniques such as soldering, welding, or brazing. In some embodiments, the end plates may have a thickness greater than the insulation material thickness D1.

In some embodiments, each layer 201 of the one or more layers 201 forming the thermal insulation assembly may be bonded to a different layer 201 of the one or more layers 201. For example, each layer 201 of the one or more layers 201 may be bonded with adjoining layers in a sequential manner. The bonding of the one or more layers 201 may be accomplished by mechanical means, such as bolting or threading, or joined using techniques such as soldering, welding, or brazing.

In some embodiments, ceramic felts (not shown) may optionally be placed between the first layers 301A having a first insulation structure pattern and the second layers 301B having a second insulation structure pattern of the thermal insulation assembly 300 to further reduce heat flux though through the thermal insulation assembly 300.

In one example, as shown in FIG. 3A, a vertically alternating arrays of perforations 204 of the first layer 301A having a first insulation structure pattern and the perforations 204 of the second layer 301B having a second insulation structure pattern in an alternating fashion are stacked to form the thermal insulation assembly 300. In this example, the first layer 301A having the first insulation structure pattern and the second layer 301B having a second insulation structure pattern are shown as having about the same insulation material thickness. In practice, the insulation material thickness of each layer 201, of the one or more layers 201 forming the thermal insulation assembly 300, may have about the same insulation material thickness or different insulation material thicknesses.

By arranging the first layer 301A having a first insulation structure pattern and the second layer 301B having a second insulation structure pattern as described above, the layer-to-layer contact area, is reduced, in part, by arranging the arrays of one or more perforations 204 of the first layer 301A having the first insulation structure pattern over a solid area of the second layer 301B having arrays of one or more perforations 204 in a second insulation structure pattern. As the layer-to-layer contact area decreases, the thermal conductance, or the ability to conduct heat, between two the layers 201 that are in contact, is reduced further lowering heat flux through the thermal insulation assembly 300.

Further, by reducing the layer-to-layer contact area, there is an increase in the distance of a heat flux path through solid-to-solid contact between each layer 201 of the thermal insulation assembly 300. The distance of the heat flux path through the thermal insulation assembly 300 divided by a linear path, for example the thermal insulation assembly height D3, or a direct solid-to-solid path through the entirety of the thermal insulation assembly defines the tortuosity of the heat flux path. An example of a heat flux path 306 through the thermal insulation assembly 300 is shown in FIG. 3A. In this example, the solid-to-solid path, as illustrated by the heat flux path 306 in FIG. 3A, relates to the actual number of portions of the layers 201 in the thermal insulation assembly 300 that are in solid-to-solid contact. In one example, solid-to-solid path can in practice be about 20 or greater. As heat flux tortuosity increases above 1, the heat flux through the thermal insulation assembly 300 decreases. In some embodiments of the thermal insulation assembly 300, as shown in FIG. 3A, the perforations 204 in a first layer 201 (e.g., top layer 201) have a first pattern, which is formed in a first direction that is parallel to the top surface (e.g., X-Y plane), and the perforations 204 in a second layer 201 (e.g., layer below the top layer 201) have a second pattern, which is also formed in the first direction that is parallel to the top surface (e.g., X-Y plane), and the perforations 204 in the first pattern are not aligned in a second direction (e.g., Z-direction) with the perforations 204 in the second pattern.

In some embodiments, it is desirable to form a thermal insulation assembly 300 that includes two or more regions that each include different materials that are used to form the layers 201 disposed therein. In some embodiments, the properties of the materials selected for use in each of the regions can include a characteristic or material property that includes, for example, an improved load bearing capability within a first desired temperature range or a desired thermal conductivity within a second desired temperature range. In some embodiments, it is desirable to include one or more layers 201 within a first region of a thermal insulation assembly 300 that includes a first material that has desirable load bearing characteristics (e.g., compressive strength) at the higher temperatures experienced by the layers 201 positioned closer to the hotter portion of the pressure vessel 100, such as closer to a heater 121 and the process capsule 118, and a second region that includes one or more layers 201 that includes a second material that has better thermal insulating properties (e.g., lower thermal conductivity), and is used in a region of the thermal insulation assembly 300 where lower temperatures are achieved during processing. The formation of the second region will allow a second material to be selected that can reliably support the load applied to the thermal insulation assembly 300 without being damaged by an exposure to temperatures that exceed its load bearing capabilities at the operating temperatures formed within the second region, while also improving the thermal insulating ability of the thermal insulation assembly 300 due to the second material's improved thermal insulating properties over the first material. In one example, a first region of the thermal insulation assembly 300 includes two or more layers 201 that are formed from a superalloy (e.g., Inconel®) and a second region of the thermal insulation assembly 300, which is positioned a distance from the heated/hotter regions of the pressure vessel 100 by the two or more layers of the superalloy material, includes two or more layers 201 that are formed from a titanium-based alloy (e.g., Ti-6Al-4V alloy). In this example, the first material has a higher thermal conductivity than the second material, but has better structural properties at higher temperatures than the second material. In another example, a first region of the thermal insulation assembly 300 includes two or more layers 201 that are formed from a first superalloy (e.g., Inconel® 718 or Inconel® 625) and a second region of the thermal insulation assembly 300, which is positioned a distance from the heated/hotter regions of the pressure vessel 100 by the two or more layers of the first superalloy material, includes two or more layers 201 that are formed from Titanium-based alloys, oxidized steel, oxidized stainless steel.

In some embodiments, it may also be desirable to form a thermal insulation assembly 300 that includes two or more regions that each include layers 201 that have different layer thicknesses in order to alter or adjust the overall resistance to heat flow through each of the regions due to the differing number of contact resistance interfaces formed within each similarly sized region of the thermal insulation assembly 300. In one example, a first region of the thermal insulation assembly 300, which is positioned near the hottest portion of the pressure vessel 100, includes a first plurality of layers 201 that each have a first layer thickness. In this example, a second region of the thermal insulation assembly 300 includes a second plurality of layers 201 that each have a second layer thickness, wherein the second layer thickness is greater than the first layer thickness. In this example, first plurality of layers and the second plurality of layers can have similar thermal insulation assembly heights, as measured in the heat flow direction. In another example, a first region of the thermal insulation assembly 300 includes two or more layers 201 that have a first layer thickness, and a second region of the thermal insulation assembly 300 includes two or more layers 201 that have a second thickness that is greater than the first thickness. The second region being positioned a distance from the heated/hotter regions of the pressure vessel 100 by the two or more layers in the first region such that the temperature at the junction between the first and second regions is configured to achieve a desired transition temperature during operation. In this example, the thermal resistance of the second region created by the layers 201 can be configured to achieve a desired operating temperature at a surface of the thermal insulation assembly 300 that is opposite to the surface of the thermal insulation assembly 300 that is positioned closest to the hottest portion of the pressure vessel 100. The configuration provided in this example can help improve manufacturability and improve the ease of use by reducing the number of layers required to achieve the desired amount of thermal insulation created by the thermal insulation assembly 300.

Figure 3B:
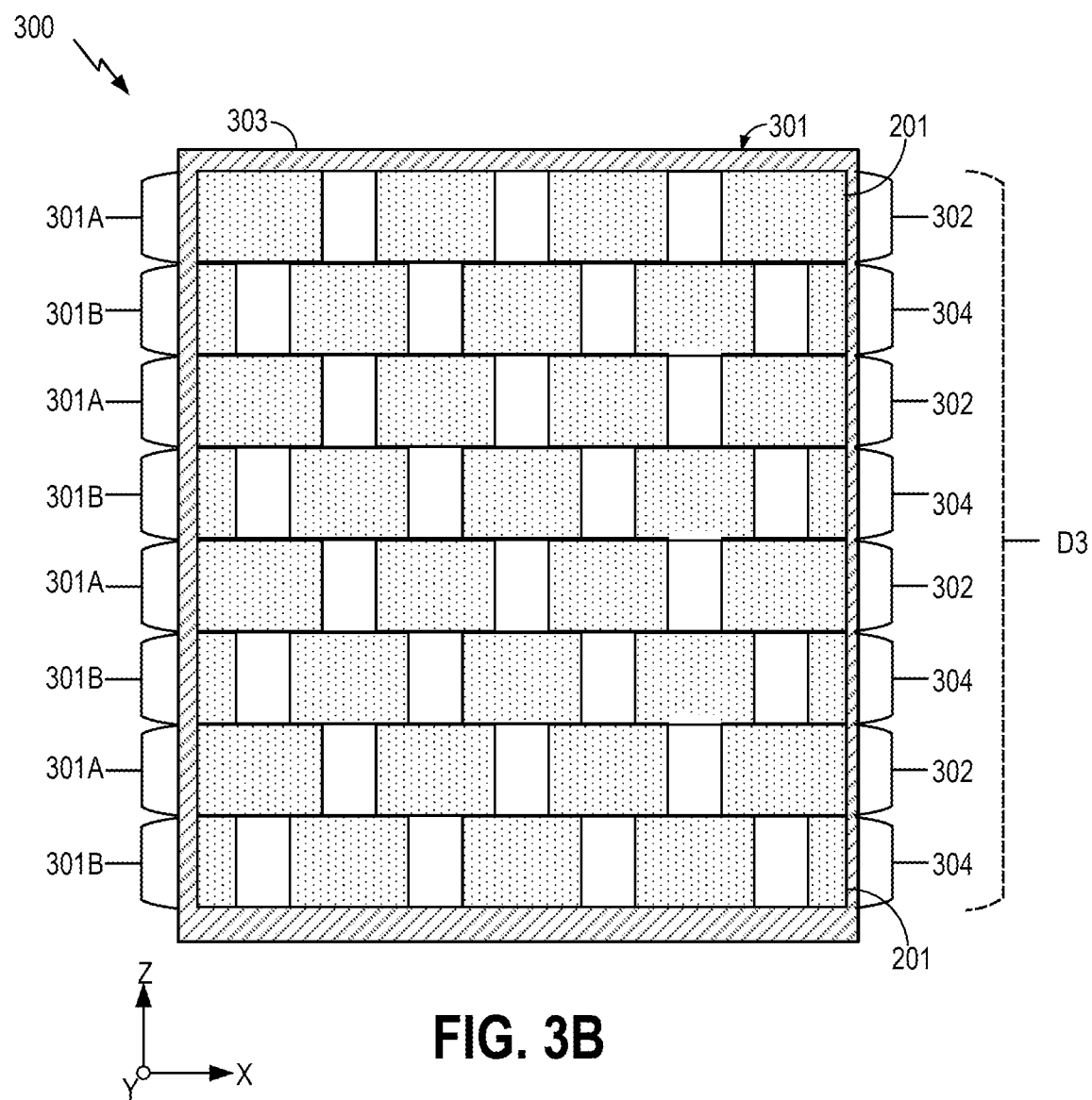
FIG. 3B depicts a schematic cross-sectional view of an enclosed thermal insulation assembly according to one or more embodiments of the present disclosure.

In other embodiments, as shown in FIG. 3B, the thermal insulation assembly 300 may additionally be hermetically sealed in an enclosure 301, which includes one or more walls 303 that form a hermetically sealed shell, or can, that surrounds the stacked layers 201. A hermetic seal generally includes a seal that prevents a fluid or gas from passing from one side of a seal to an opposing side of the seal. In some cases, it is desirable to perform an ASTM or ISO standard helium leak test to determine whether a sufficient hermetic seal has been created. The one or more walls 303 can include a rigid or flexible sealable material, which is used to form the layers 201 of the thermal insulation assembly 300, which is bonded, welded or brazed together. After which, a vacuum pressure is applied in an internal region of the enclosure 301 to reduce any contribution to thermal conductivity provided by the presence of a gas (e.g., air) remaining in the perforated areas.

By selecting the properties of the thermal insulation structures and the arrangement of the thermal insulation structures in the thermal insulation assembly 300, heat flux through the thermal insulation assembly 300 may be reduced while also reducing problems with fracturing inherent to ceramic based insulation materials.

Alternate Thermal Insulation Structure

Figure 4A:
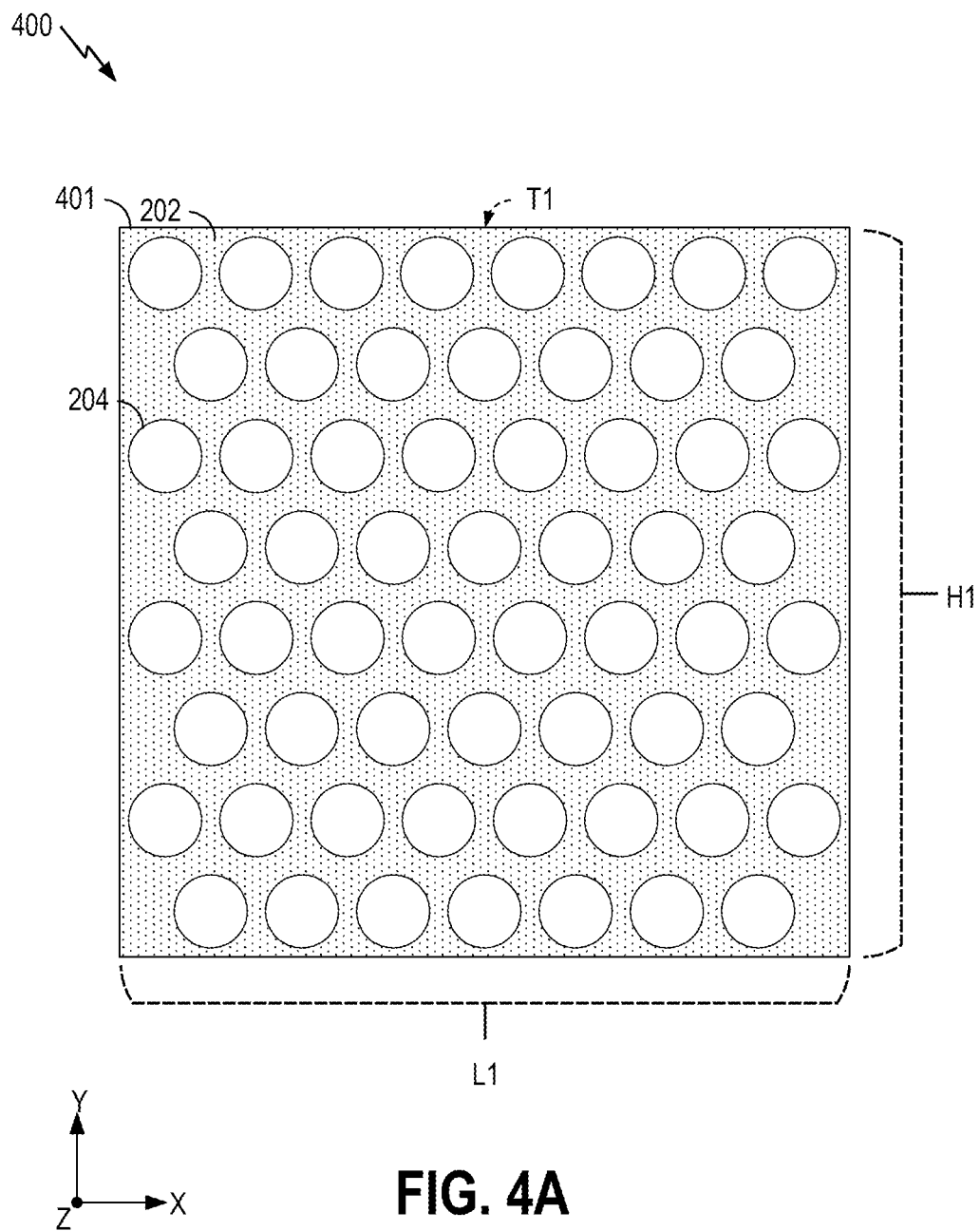
FIG. 4A depicts a schematic top-view showing a thermal insulation structure according to one or more embodiments of the present disclosure.

FIG. 4A depicts a schematic top-view of a thermal insulation structure 200 that comprises an alternate thermal insulation structure 400 that can be formed by low-cost manufacturing techniques according to an embodiment of the current disclosure. The alternate thermal insulation structure 400 includes at least one layer 401 that can be formed from a roll of material. Layer 401 of the thermal insulation structure 400 includes the insulation material 202 as described above. The insulation material 202 of layer 401 has a target Ra, as described above in FIG. 2. In some embodiments, the insulation material 202 of layer 401 includes a coating 218, as described above in FIG. 2.

The thermal insulation structure 400 includes at least one perforation 204 formed within the at least one layer 401. FIG. 4A includes a plurality of perforations 204 in a two-dimensional linear pattern (e.g., a grid pattern or a mesh pattern). In some embodiments, the perforations 204 may be in a hexagonal close-packed type pattern, a two-dimensional non-linear pattern, a repeating pattern, a random pattern, a circular array having one or more rows spaced radially from a center, or combination thereof.

Layer 401 includes an insulation material thickness D1 (not shown) in the z-direction, as described above in FIG. 2. Layer 401 includes an insulation structure height H1 in the y-direction. The insulation structure height H1 is about equal to the thermal insulation assembly height D3 described above in FIG. 2. Layer 401 includes an insulation structure length L1. The insulation structure length L1 is about 25 mm to about 2 m. In some embodiments, the insulation structure length L1 is about equal to a spiral length L2, as described below in FIG. 4B, or about equal to a first circumference C1, as described below in FIG. 5. In one embodiment, the insulation material thickness D1 of layer 401 is about equal across the insulation structure length L1. In some embodiments, the insulation material thickness D1 of layer 401 is about equal across the insulation structure height H1. In other embodiments, insulation material thickness D1 of layer 401 may vary across the insulation structure length L1, the insulation structure height H1, or both.

Layer 401 of the thermal insulation structure 400 may be fabricated by any suitable means, for example, using a roll-to-roll process. The roll-to-roll process may include beginning with a roll of insulation material 202 on a mandrel. The roll-to-roll process may include unrolling the roll of insulation material 202 from the mandrel and passing it through various continuous process steps. For example, the continuous processing steps may include, in any order, surface preparation of one or more surfaces of the roll of insulation material 202 to meet the target Ra as described above, forming the one or more perforations 204 as described above, forming the insulation material thickness D1, depositing the coating 218, and trimming the roll of insulation material 202 to a final dimension. For example, trimming the roll of insulation material 202 to the insulation structure height H1 and insulation structure length L1 for layer 401 before re-rolling the insulation material 202 on a second mandrel. For example, trimming the roll of insulation material 202 to, trimming the roll of insulation material to the first radius of a layer of the plurality of layers. The re-rolling could encompass formation of the final rolled cylindrical insulator assembly itself, or the re-rolling after surface preparation and perforation could simply be an intermediate step prior to another unrolling and re-rolling to form final assembly.

Alternate Thermal Insulation Assembly

Figure 4B:
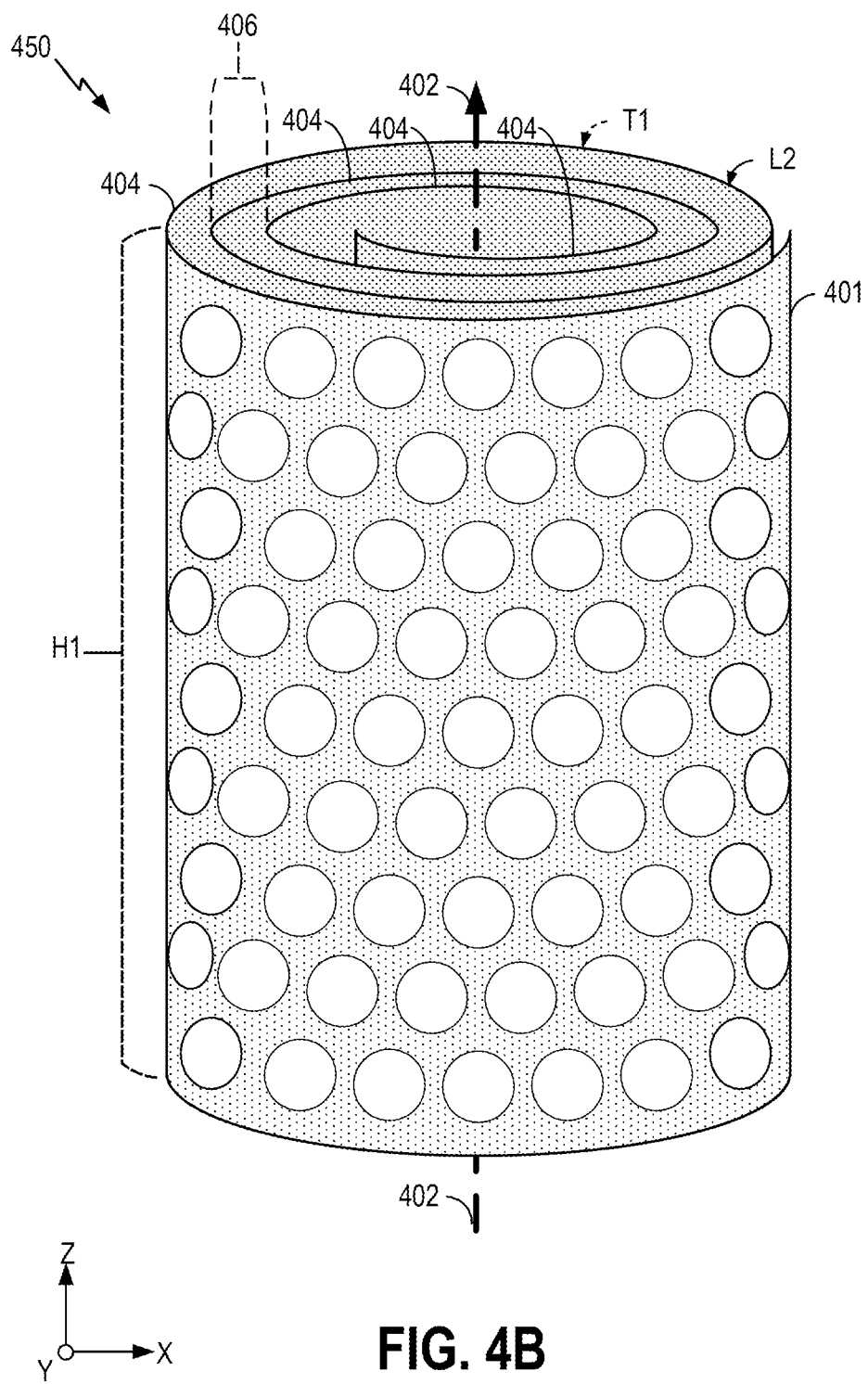
FIG. 4B depicts a schematic view of a thermal insulation structure according to one or more embodiments of the present disclosure.

FIG. 4B depicts a schematic view of a thermal insulation structure 200 that comprises another alternate thermal insulation assembly according to an embodiment of the current disclosure. In one embodiment, the thermal insulation assembly is a spiral insulator assembly 450 that is configured to receive a load in an axial direction. The spiral insulator assembly 450 may be illustrative of the final form assembly of the roll-to-roll process described above in relation to the layer 401 shown in FIG. 4A. In some embodiments, the thickness of the wall of the spiral insulator assembly 450, as measured in the radial direction, can be varied as the radius of the spiral increases from the central axis. In one example, it may be desirable for the thickness of the wall of the spiral insulator assembly 450 to increase in thickness as the radial distance increases. Alternately, it may be desirable for the thickness of the wall of the spiral insulator assembly 450 to decrease in thickness as the radial distance increases.

The spiral insulator assembly 450 includes at least one layer 401 of the thermal insulation structure 400 described above wrapped one or more times around a central axis 402 forming a cylindrical roll of layers (e.g., a spiral pattern) with perforations perpendicular to the central axis. As a single structure, the configuration of the spiral insulator assembly 450 may allow for mechanical loading of the thermal insulation assembly without sliding or slipping under mechanical load thus reducing, or eliminating the use of tie rods, or other bonding/joining techniques, described above in FIG. 3A. A ratio of the height H1 to the overall lateral diameter (e.g., measure in the X-Y-plane) of the spiral insulator assembly 450 is selected so that the spiral insulator assembly 450 will not buckle under the loads applied to the spiral insulator assembly 450 along a direction parallel to the central axis 402. In some embodiments, the spiral insulator assembly 450 can be enclosed and/or contained within a frame, tube or support structure that is configured to take-up a significant portion of the applied load when the spiral insulator assembly 450 is heated to its operating temperature during processing.

The spiral insulator assembly 450 has a spiral length L2. The spiral length L2 is about equal to the insulation structure length L1. Each rotation of the layer 401 about the central axis 402 creates a spiral layer 404. In one embodiment, the spiral insulator assembly 450 may include about one spiral layer 404 to about 100 spiral layers 404. In another embodiment, the spiral insulator assembly 450 may include about 100 spiral layer 404 to about 500 spiral layers 404. In another embodiment, the spiral insulator assembly 450 may include about 500 spiral layer 404 to about 1000 spiral layers 404. Each of the spiral layers 404 is separated from the next spiral layer 404 by a separation distance 406. In some embodiments, the separation distance 406 between each spiral layer 404 is minimal and in some cases is small gap that is adapted to receive a felt material or powder to reduce gas thermal conduction or convection. In other embodiments, the separation distance 406 between each spiral layer 404 may be a non-uniform gap.

While not shown in FIG. 4B, in some embodiments, the spiral insulator assembly 450 can include at least one layer 201 disposed over opposing ends of the spiral insulator assembly 450. In some embodiments, two or more spiral insulator assemblies 450 can be stacked on top of each other to achieve a desired thermal insulation assembly height H1. The stacked two or more spiral insulator assemblies 450 can be joined together by bonding, welding or bolting, for example, to form an inseparable multicomponent spiral insulator assembly. In some embodiments, the multicomponent spiral insulator assembly can be enclosed and/or contained within a frame, tube or support structure that is configured to take-up a significant portion of the applied load when the spiral insulator assembly 450 is heated to its operating temperature during processing.

In some embodiment, the spiral insulator assembly 450 can include one or more layers of an insulating material containing mesh (e.g., metal wire mesh). The mesh may include a woven, intertwined or welded metal wire mesh that includes a material used to form the insulation material 202 described herein. In some embodiments, the spiral insulator assembly 450 can include one or more mesh layers that are interposed between one or more layers of material (e.g., spiral layer 404) formed from a solid metal sheet or plate. In some embodiments, the surface of one or more mesh layers disposed within the spiral insulator assembly 450 may include a surface that includes a desired roughness, a surface that includes a coating as described herein, or both.

In some embodiments, one or more units formed similar to assemblies illustrated in FIG. 4A or FIG. 4B could be used to replace some or all of the portions of the stacked ring assemblies 106 shown in FIG. 1. In one example, a spiral insulator assembly 450 can be positioned around the outside of the heater 104 to supplement or replace the thermal insulating properties of the ceramic ring 110 of pressure vessel 100.

Second Alternate Thermal Insulation Structure

Figure 5A:
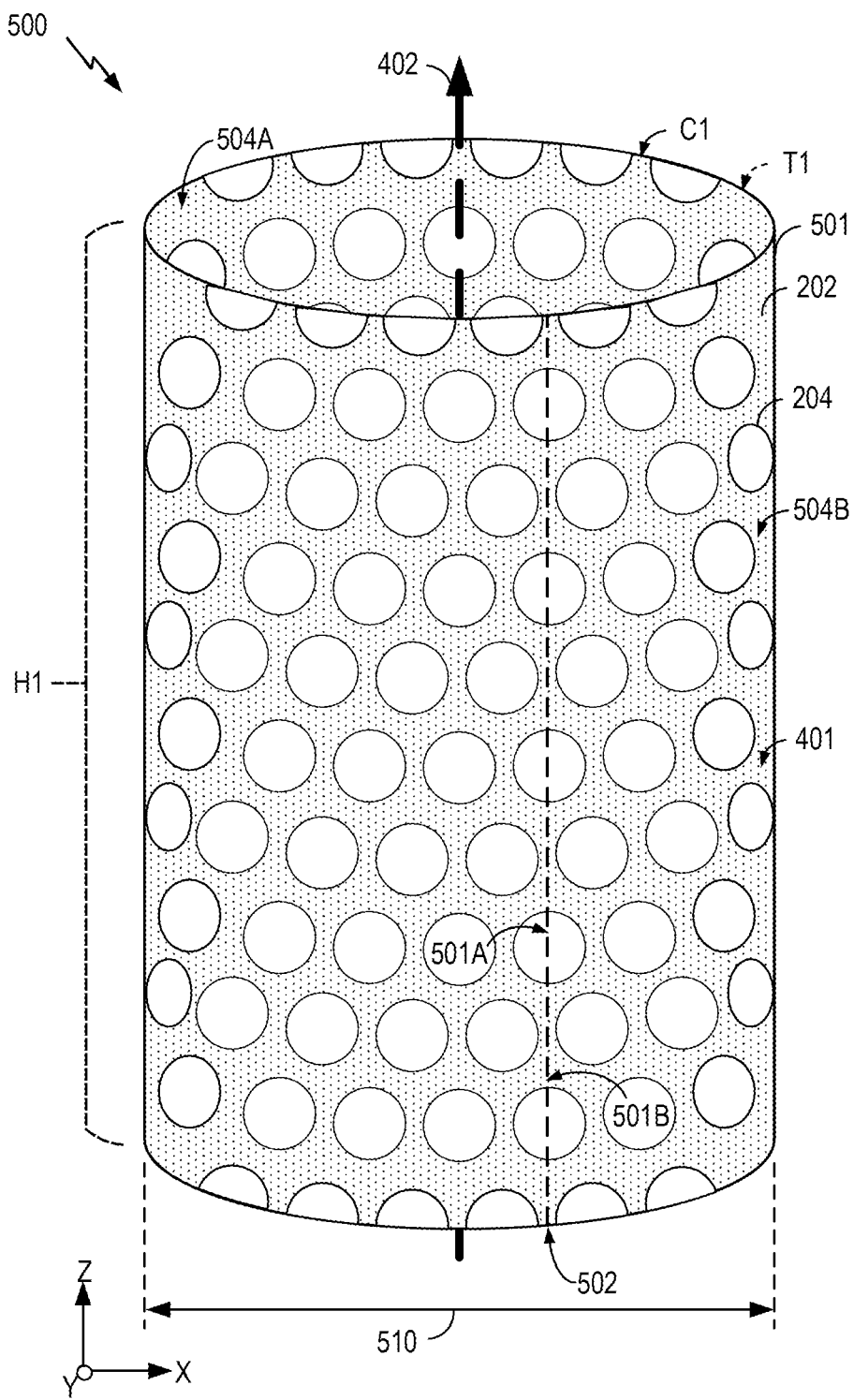
FIG. 5A depicts a schematic view of a thermal insulation structure according to one or more embodiments of the present disclosure.

FIG. 5A depicts a schematic view of a thermal insulation structure 200 that comprises an alternate thermal insulation structure 500 according to an embodiment of the current disclosure. In one embodiment, the thermal insulation structure is a cylindrical insulator structure 500.

The cylindrical insulator structure 500 includes at least one layer 401 of the insulation structure 400 described above. Layer 401 includes a first end 501A, and a second end 501B. The cylindrical insulator structure 500 has a first circumference C1. The first circumference C1 is about equal to insulation structure length L1. The cylindrical insulator structure 500 has an inner diameter 510.

The first circumference C1 of the cylindrical insulator structure 500 is formed by wrapping layer 401 around a central axis 402 and positioning the first end 501A to the second end 501B at a junction 502 to form at least one tubular shaped layer 501 of the cylindrical insulator structure 500.

In some embodiments, the first end 501A and the second end 501B of layer 401 may overlap at the junction 502 or may include a gap between the first end 501A and the second end 501B.

In some embodiments, the junction 502 can be joined at the first end 501A and the second end 501B. The junction 502 may be joined at the first end 501A and the second end 501B by any suitable process including, but not limited to, welding, bonding, mechanical fastening, or any combination thereof.

The cylindrical insulator structure 500 includes one or more perforations 204 perpendicular to the central axis 402. The cylindrical insulator structure 500 includes an inner surface 504A, and an outer surface 504B.

While not shown in FIG. 5A, in some embodiments, the cylindrical insulator structure 500 can include at least one layer 201 disposed over opposing ends of the cylindrical insulator structure 500.

In some embodiments, two or more cylindrical insulator structure 500 can be stacked on top of each other to achieve a desired thermal insulation assembly length L1. The stacked two or more cylindrical insulator structure 500 can be joined together by bonding, welding or bolting, for example, to form an inseparable multicomponent cylindrical insulator assembly. In some embodiments, the multicomponent cylindrical insulator assembly can be enclosed and/or contained within a frame, tube or support structure that is configured to take-up a significant portion of the applied load when the cylindrical insulator structure 500 is heated to its operating temperature during processing.

The cylindrical insulator structure 500 can also include one or more layers of an insulating material containing mesh (e.g., metal wire mesh). The mesh may include a woven, intertwined or welded metal wire mesh that includes a material used to form the insulation material 202 described herein. In some embodiments, the cylindrical insulator structure 500 can include one or more mesh layers that are interposed between one or more layers of material (e.g., layer 401) formed from a solid metal sheet or plate. In some embodiments, the surface of one or more mesh layers disposed within the cylindrical insulator structure 500 may include a surface that includes a desired roughness, a surface that includes a coating as described herein, or both.

Second Alternate Thermal Insulation Assembly

Figure 5B:
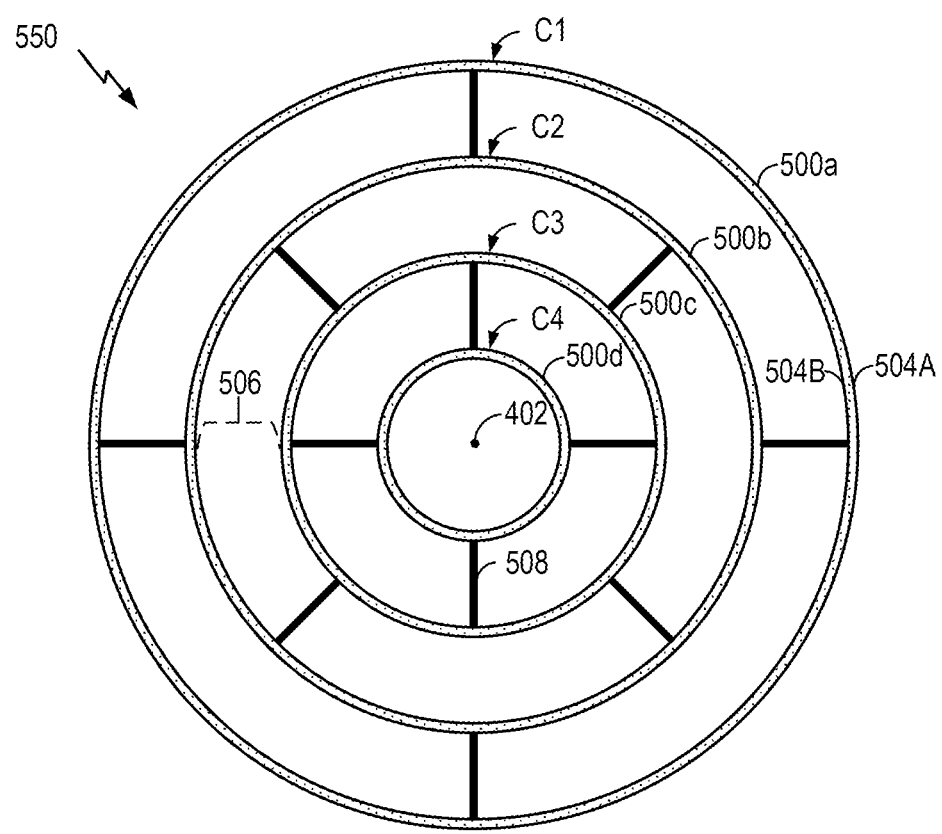
FIG. 5B depicts a schematic plan view of a thermal insulation structure according to one or more embodiments of the present disclosure.

FIG. 5B depicts a schematic top-view of a thermal insulation structure 200 that comprises an alternate thermal insulation assembly according to an embodiment of the current disclosure. In one embodiment, the thermal insulation assembly is a cylindrical insulator assembly 550 that includes a plurality of cylindrical sections.

The cylindrical insulator assembly 550 includes one or more cylindrical insulator structures 500. In one embodiment, the cylindrical insulator assembly 550 includes four cylindrical insulator structures 500, a first cylindrical insulator structure 500a, a second cylindrical insulator structure 500b, a third cylindrical insulator structure 500c, and a fourth cylindrical insulator structure 500d. In one embodiment, the cylindrical insulator assembly 550 may include about one cylindrical insulator structure 500 to about 100 cylindrical insulator structures 500. In another embodiment, the cylindrical insulator assembly 550 may include about 100 cylindrical insulator structure 500 to about 500 cylindrical insulator structures 500. In another embodiment, the cylindrical insulator assembly 550 may include about 500 cylindrical insulator structure 500 to about 1000 cylindrical insulator structures 500.

Each cylindrical insulator structure 500 of the one or more cylindrical insulator structures 500 forming the cylindrical insulator assembly 550 has a circumference, and an inner diameter (not shown). For example, the first cylindrical insulator structure 500a has a first circumference C1, the second cylindrical insulator structure 500b has a second circumference C2, the third cylindrical insulator structure 500c has a third circumference C3, and the fourth cylindrical insulator structure 500d has a fourth circumference. The circumference of each cylindrical insulator structure 500 forming the cylindrical insulator assembly 550 is about equal to the insulation structure length L1 of each layer 401 used to form each cylindrical insulator structure 500.

In one embodiment, each of the four cylindrical insulator structures 500, the first cylindrical insulator structure 500a, the second cylindrical insulator structure 500b, the third cylindrical insulator structure 500c, and the fourth cylindrical insulator structure 500d, are arranged in a concentric pattern from the central axis 402. Each of the four cylindrical insulator structures 500 in the concentric pattern are distanced from an adjacent cylindrical insulator structure 500 in the concentric pattern by a separation distance 506.

In other embodiments, there may be more than one central axis 402, each central axis 402 having one or cylindrical insulator structures 500 arranged in a concentric pattern from each central axis 402. In other embodiments, the separation distance 506 between adjacent cylindrical insulator structures 500 in the concentric pattern may be different.

In some embodiments, the cylindrical insulator assembly 550 includes a plurality of cylindrical insulator structures 500, where one or more of the cylindrical insulator structures 500 include one or more spiral insulator assemblies 450. The one or more spiral insulator assemblies 450 can have a concentric relationship with the other parts of the cylindrical insulator assembly 550. In one example, the start and ends of each of the spiral insulator assemblies 450 within the cylindrical insulator assembly 550 are not coupled to or with other adjacently positioned cylindrical structures, and thus include radial breaks between adjacent spiral insulator assemblies 450. In other cases, the spiral insulator assemblies 450 are coupled in series to form a continuous spiral assembly.

In one embodiment, one or more radial supports 508 are radially disposed between each cylindrical insulator structure 500 of the one or more cylindrical insulator structures 500 forming the cylindrical insulator assembly 550. The one or more radial supports 508 are sized to provide mechanical support in the x-direction, y-direction, z-direction, or any combination thereof. In other embodiments, the one or more radial supports may be sized to maintain the separation distance, or concentricity, between adjacent cylindrical insulator structures 500 forming the cylindrical insulator assembly 550.

In other embodiments, the configuration of the cylindrical insulator assembly 550 may allow for mechanical loading of the thermal insulation assembly without sliding or slipping under mechanical load thus reducing, or eliminating, the one or more radial supports 508 and reduce, or eliminate, the use of tie rods, or other bonding/joining techniques, described above in FIG. 3A.

While not shown in FIG. 5B, in some embodiments, the cylindrical insulator assembly 550 can include at least one layer 201 disposed over opposing ends of the cylindrical insulator assembly 550.

Additional Considerations

While this specification contains many specific implementation details, these should not be construed as limitations on the scope of what may be claimed, but rather as descriptions of features that may be specific to particular implementations. Certain features that are described in this specification in the context of separate implementations may also be implemented, in combination, in a single implementation. Conversely, various features that are described in the context of a single implementation may also be implemented in multiple implementations, separately, or in any suitable sub-combination. Moreover, although previously described features may be described as acting in certain combinations and even initially claimed as such, one or more features from a claimed combination may, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional) to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems may generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

While the various steps in an embodiment method or process are presented and described sequentially, one of ordinary skill in the art will appreciate that some or all of the steps may be executed in different order, may be combined or omitted, and some or all of the steps may be executed in parallel. The steps may be performed actively or passively. The method or process may be repeated or expanded to support multiple components or multiple users within a field environment. Accordingly, the scope should not be considered limited to the specific arrangement of steps shown in a flowchart or diagram.

Unless defined otherwise, all technical and scientific terms used have the same meaning as commonly understood by one of ordinary skill in the art to which these systems, apparatuses, methods, processes and compositions belong.

In this disclosure, the terms "top", "bottom", "side", "above", "below", "up", "down", "upward", "downward", "horizontal", "vertical", and the like do not refer to absolute directions. Instead, these terms refer to directions relative to a nonspecific plane of reference. This non-specific plane of reference may be vertical, horizontal, or other angular orientation.

The singular forms "a," "an," and "the" include plural referents, unless the context clearly dictates otherwise. Within a claim, reference to an element in the singular is not intended to mean "one and only one" unless specifically so stated, but rather "one or more." Unless specifically stated otherwise, the term "some" refers to one or more.

Embodiments of the present disclosure may suitably "comprise", "consist" or "consist essentially of" the limiting features disclosed, and may be practiced in the absence of a limiting feature not disclosed. As used here and in the appended claims, the words "comprise," "has," and "include" and all grammatical variations thereof are each intended to have an open, non-limiting meaning that does not exclude additional elements or steps.

"Optional" and "optionally" means that the subsequently described material, event, or circumstance may or may not be present or occur. The description includes instances where the material, event, or circumstance occurs and instances where it does not occur.

As used, the term "determining" encompasses a wide variety of actions. For example, "determining" may include calculating, computing, processing, deriving, investigating, looking up, for example, looking up in a table, a database or another data structure, and ascertaining. Also, "determining" may include receiving, for example, receiving information, and accessing, for example, accessing data in a memory. Also, "determining" may include resolving, selecting, choosing, and establishing.

When the word "approximately" or "about" are used, this term may mean that there may be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

As used, terms such as "first" and "second" are arbitrarily assigned and are merely intended to differentiate between two or more components of a system, an apparatus, or a composition. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is envisioned under the scope of the various embodiments described.

Although only a few example embodiments have been described in detail, those skilled in the art will readily appreciate that many modifications are possible in the example embodiments without materially departing from the disclosed scope as described. Accordingly, all such modifications are intended to be included within the scope of this disclosure as defined in the following claims.

In the claims, means-plus-function clauses are intended to cover the structures described as performing the recited function and not only structural equivalents, but also equivalent structures. For example, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f), for any limitations of any of the claims, except for those in which the claim expressly uses the words 'means for' together with an associated function.

The following claims are not intended to be limited to the embodiments provided but rather are to be accorded the full scope consistent with the language of the claims.

What is claimed is:

1. A thermal insulation structure, comprising a plurality of stacked layers, wherein the plurality of stacked layers comprise:
    a first layer comprising:
      a first surface;
      a second surface, disposed opposite of the first surface; and
      a plurality of perforations extending between the first surface and the second surface, wherein the plurality of perforations comprise a first pattern of two or more perforations that form a pattern in a first direction that is parallel to the first surface; and
    a second layer comprising:
      a third surface, wherein the third surface is in direct contact with the second surface of the first layer;

a fourth surface, disposed opposite of the third surface; and a plurality of perforations extending between the third surface and the fourth surface, wherein the plurality of perforations comprise a second pattern of two or more perforations that form a pattern in the first direction that is parallel to the third surface; wherein the plurality of perforations in the first layer and the plurality of perforations in the second layer each comprise an open area percentage that is between 10% and 60%, wherein the open area percentage is measured by a sum of the open areas of the plurality of perforations measured at a plane that is aligned parallel to a surface of the first layer and the second layer wherein the first layer and the second layer each comprise an insulation material selected from a group consisting of zirconium and zirconium alloys, titanium-based alloys and superalloys.

2. The thermal insulation structure of claim 1, wherein the perforations in the first pattern are spaced a distance in the first direction from the perforations in the second pattern.

3. The thermal insulation structure of claim 1, wherein the perforations in the first pattern and the perforations in the second pattern each extend in a second direction that is perpendicular to the first direction, and the perforations in the first pattern are not aligned in the second direction with the perforations in the second pattern.

4. The thermal insulation structure of claim 1, wherein the first layer and the second layer each comprise a material that has a thermal conductivity below about 25 watts per meter-kelvin (W/m-K).

5. The thermal insulation structure of claim 1, wherein the perforations in the first pattern and the perforations in the second pattern each extend in a second direction that is perpendicular to the first direction, and the first layer and the second layer have a thickness in the second direction that is about 0.025 millimeters (mm) to about 10 mm.

6. The thermal insulation structure of claim 5, wherein the first pattern and the second pattern each comprise a circular array of perforations, the circular array further comprising:
one or more rows, wherein:
each row of the one or more rows is spaced radially from a center of the thermal insulation structure, and
each row of the one or more rows includes at least one perforation.

7. The thermal insulation structure of claim 5, wherein the first pattern and the second pattern each comprise a two-dimensional linear pattern.

8. The thermal insulation structure of claim 1, wherein at least one of the first surface, the second surface, the third surface and the fourth surface have a roughness average (Ra) of about 0.5 micrometers (µm) to about 5 µm.

9. The thermal insulation structure of claim 1, wherein at least one of the first surface and the fourth surface include a coating.

10. The thermal insulation structure of claim 9, wherein the coating comprises a ceramic material, a glass material, a metal oxide, or any combination thereof.

11. The thermal insulation structure of claim 1, wherein the first pattern and the second pattern comprise a vertically alternating pattern.

12. The thermal insulation structure of claim 1, wherein at least one of the first layer and the second layer comprise a mesh.

13. The thermal insulation structure of claim 1, wherein the plurality of stacked layers include a first region of one or more layers of a first material having a first compressive strength and first thermal conductivity and a second region of one or more layers of a second material having a second compressive strength and second thermal conductivity, and the first compressive strength is greater than the second compressive strength and the first thermal conductivity is less than the second thermal conductivity.

14. The thermal insulation structure of claim 13, wherein the first material is a superalloy and the second material is a titanium-based alloy.

15. A thermal insulation structure, comprising a plurality of stacked layers, wherein the plurality of stacked layers comprise:
a first layer comprising:
a first surface;
a second surface, disposed opposite of the first surface; and
a plurality of perforations extending between the first surface and the second surface, wherein the plurality of perforations comprise a first pattern of two or more perforations that form a pattern in a first direction that is parallel to the first surface; and
a second layer comprising:
a third surface, wherein the third surface is in direct contact with the second surface of the first layer;
a fourth surface, disposed opposite of the third surface; and
a plurality of perforations extending between the third surface and the fourth surface, wherein the plurality of perforations comprise a second pattern of two or more perforations that form a pattern in the first direction that is parallel to the third surface: wherein
the first layer and the second layer each comprise an insulation material selected from a group consisting of zirconium and zirconium alloys, titanium-based alloys, and superalloys,
the perforations in the first pattern and the perforations in the second pattern each extend in a second direction that is perpendicular to the first direction, and the first layer and the second layer have a thickness in the second direction that is about 0.025 millimeters (mm) to about 10 mm,
the first pattern and the second pattern each comprise a circular array of perforations, the circular array further comprising:
one or more rows, wherein:
each row of the one or more rows is spaced radially from a center of the thermal insulation structure, and
each row of the one or more rows includes at least one perforation.

16. A thermal insulation structure, comprising a plurality of stacked layers, wherein the plurality of stacked layers comprise:
a first layer comprising:
a first surface;
a second surface, disposed opposite of the first surface; and
a plurality of perforations extending between the first surface and the second surface, wherein the plurality of perforations comprise a first pattern of two or more perforations that form a pattern in a first direction that is parallel to the first surface; and
a second layer comprising:
a third surface, wherein the third surface is in direct contact with the second surface of the first layer;
a fourth surface, disposed opposite of the third surface; and a plurality of perforations extending between the third surface and the fourth surface, wherein the plurality of perforations comprise a second pattern of two or more perforations that form a pattern in the first direction that is parallel to the third surface; wherein the perforations in the first pattern and the perforations in the second pattern each extend in a second direction that is perpendicular to the first direction; wherein the perforations in the first pattern are not aligned in the second direction with the perforations in the second pattern; wherein the first layer and the second layer each comprise an insulation material selected from a group consisting of zirconium and zirconium alloys, titanium-based alloys, and superalloys.

* * * * *